A. B. DISS.
CASTER FOR PIANOS AND OTHER USES.
APPLICATION FILED JAN. 20, 1915.
1,160,584. Patented Nov. 16, 1915.
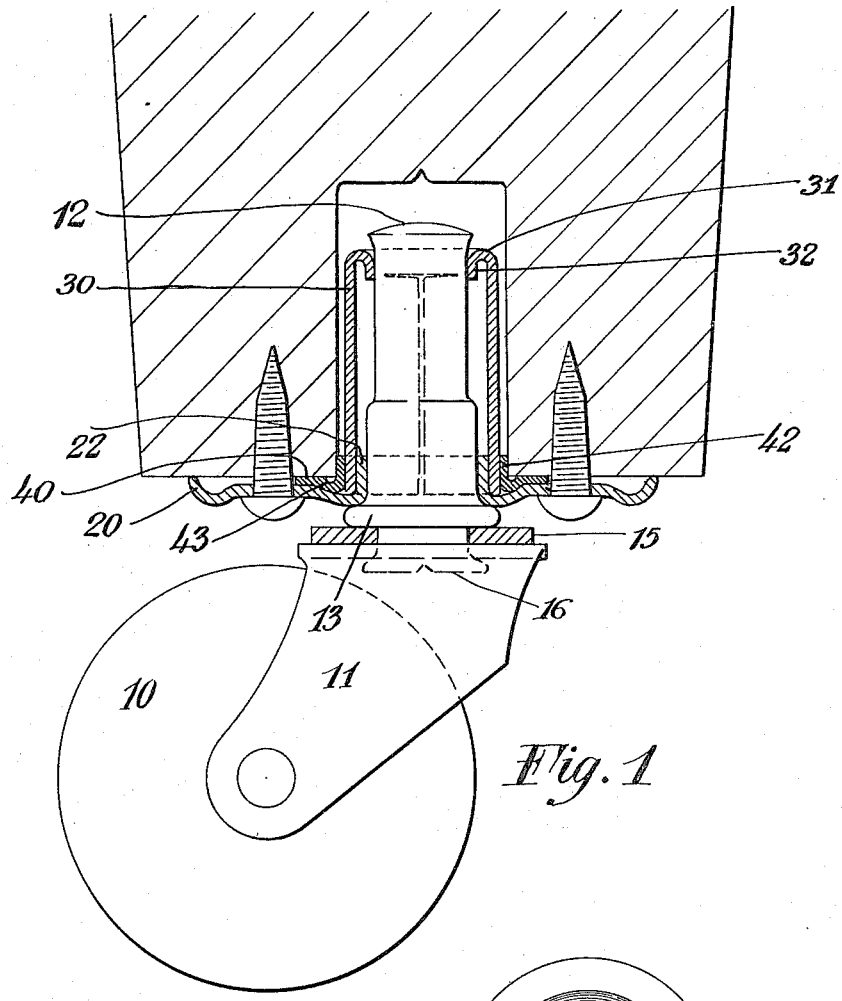
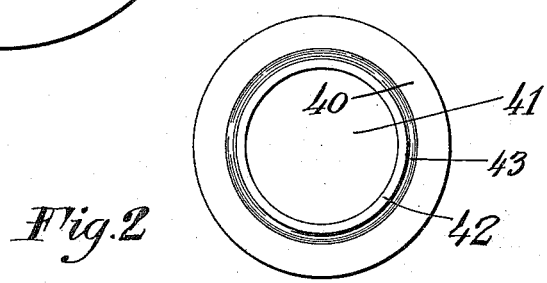

UNITED STATES PATENT OFFICE.

ALBERT B. DISS, OF NEWARK, NEW JERSEY, ASSIGNOR TO UNIVERSAL CASTER & FOUNDRY COMPANY, OF NEW YORK, N. Y., A CORPORATION OF NEW JERSEY.

CASTER FOR PIANOS AND OTHER USES.

1,160,584.      Specification of Letters Patent.      Patented Nov. 16, 1915.

Application filed January 20, 1915. Serial No. 3,208.

*To all whom it may concern:*

Be it known that I, ALBERT B. DISS, of Newark, New Jersey, a citizen of the United States of America, manufacturer, have invented certain new and useful Improvements in Casters for Pianos and other Uses, of which the following is a specification, accompanied by drawings.

The principal object of the invention is to produce an improved construction of caster of the type suitable more particularly for pianos and heavy furniture having the caster pintle rotatable in a suitable sleeve or bearing, which construction shall combine economy of manufacture with great strength and thorough reliability and durability in use.

The present invention, which is an improvement upon that disclosed in my pending application Serial Number 838,334, filed May 13, 1914, in its most complete and preferred form provides a caster having the aforementioned characteristics and is of very simple construction.

It has a carrying plate that is screwed to the base of the piano or other furniture, surrounds the pintle, and forms a journal bearing for the lower end of the pintle, supported upon the jaws and pintle of the caster, preferably without interposed ball bearings. The carrying plate has an upturned flange which extends inside of and loosely supports the pintle sleeve. The pintle sleeve is a hollow cylinder with its upper end inturned and downturned to form a smooth unbroken upper bearing for the pintle, which is upset and enlarged to form a head for preventing the pintle dropping out of the sleeve. The sleeve is formed from a blank of strong sheet metal and the inturned upper end of the sleeve is a continuous unbroken collar around the pintle, from which extends two downwardly bent semi-cylindrical sleeve members. There is interposed between the carrying plate and the furniture leg a second plate, which has an upturned flange surrounding the sleeve and prohibiting the lateral movement of the lower end of said sleeve as desired. The sleeve is secured or confined between the head of the pintle, the carrying plate and the interposed plate and when it is inserted in the hole bored in the furniture to fit it and the carrying plate secured by screws to the base of the furniture the interposed plate having been properly placed in position the plates, sleeve, pintle and other parts of the caster are secured to the furniture so that the caster will operate properly. This construction, therefore assures the holding of the sleeve in respect to the carrying plate without strain if the hole bored in the furniture is not an accurate fit or in exactly right relation to the carrying plate.

In the drawings, Figure 1 is a side view of a caster embodying the improvements in the best form known to me, secured in place beneath a body of wood, which may be the base of a piano or other article to be supported, and which is shown in section: Fig. 2 is a top view of the interposed or secondary plate.

In the drawings, 10 is the caster wheel, 11 the caster jaws or horn of any suitable construction, and 12 is the pintle. The pintle is preferably larger where it bears within the carrying plate 20 than at its upper portion where it bears within the sleeve 30, and the upper end is upset or headed to form an enlargement of sufficient size to prevent its dropping out of the sleeve 30 when the furniture and caster are raised. Toward the lower end, the pintle has an enlargement 13, providing an upper shoulder for supporting the carrying plate 20. The lower side of the enlargement 13 forms a shoulder for securing the jaws or horn of the caster, preferably with an interposed strengthening plate 15, as shown. The lower end of the pintle extends through the jaws and is upset and thereby riveted tightly to the jaws, as shown at 16.

The construction of the caster wheel, jaws and pintle shown and described is only one of a variety of forms of these parts which may be employed with the sleeve and carrying plate shown.

The carrying plate 20 is preferably circular and of steel construction and preferably corrugated to form an annular channel or groove near its periphery to strengthen it and give to its exposed exterior a neat rounded shape. It is provided with screw holes, by means of which it can be screwed to the furniture, as illustrated in Fig. 1. Centrally, the carrying plate has an opening fitting around the pintle and an upturned flange 22, which is adapted internally to fit within the sleeve 30. At the base of this flange 22 the carrying plate is annularly corrugated, forming a channel or groove on the upper face, which approximately fits and receives the lower end of the sleeve 30, this corrugation also strengthening the plate and giving a rounded under surface which is well adapted for supporting the plate upon the correspondingly-shaped shoulder of the pintle.

The plate 40 is preferably circular and of steel construction and centrally has an opening 41 fitting around the sleeve and an upturned flange 42, which is adapted internally to form a smooth journal bearing for the external bottom portion of the sleeve 30. At the base of this flange 42, this plate is annularly corrugated, forming a channel or groove on the upper face which receives the leg of the furniture, this corrugation also strengthens the plate. This plate which is superimposed above the carrying plate is placed in its proper position and pressed by friction drive to a tight fit so that it not only holds the sleeve but itself is prohibited from dropping off during shipment.

The upturned ends of the carrying plate are preferably turned up to an extent so that they and the horizontal parts of the superimposed plate 40 will lie in the same horizontal plane, for obvious reasons.

The secondary or superimposed plate may be of such size that its periphery meets the aforementioned upturned ends in which case however it would necessarily have to be provided with openings for the screws and so entail precise positioning of the two plates prior to their subjection to any friction drive. Again the secondary plate may be of such size that its exterior periphery will contact with the screws, but I do not limit myself to such particular construction.

The sleeve 30 provides a very strong and, at the same time, very simple and inexpensive form of bearing for the upper end of the pintle, and a means of preventing the pintle dropping downward. It can be formed of a sheet metal blank which has a perforated central portion, which becomes the bearing collar 31 when in its final shape, and the two side members which become in their final shape the two side members or halves of the sleeve 30. The annular part is pressed in suitable dies to form a collar of inverted U-section, from which extend downward in continuity with the outer leg of the U of the two sleeve members formed from side portions of the blank, which are bent and pressed to half-cylinders as shown dotted in Fig. 1. It will be seen that the finished sleeve has its upper end inturned and downturned parallel with the pintle to form a bearing flange 32 around the pintle and a continuous collar in the form of an inverted channel or U, giving great strength to the bearing for the upper end of the pintle and providing, by the width of the U, for ample space above it for the enlarged head of the pintle within the hole bored to fit the sleeve.

In assembling the carrying plate, sleeve and pintle, it is only necessary to pass the pintle through the carrying plate and through the sleeve, first securing the sleeve to the carrying plate by means of the superimposed plate being forced to a tight fit as described. It will be noted however that the secondary plate may be loosely inserted and held in position by the weight of the furniture leg and the attaching means holding the carrying plate to the leg.

It will be seen that in applying the caster to furniture, the hole can be bored of the appropriate size and the caster then put in place, pushing or driving the pintle through the sleeve into the hole and then fixing the carrying plate by its screws. The pintle at its upper end will be accurately supported in the journal bearing or collar 31 at the upper end of the sleeve. The lower end of the sleeve will lie between the flange 22 of the carrying plate and flange 42 of the superimposed plate and they will relatively center the sleeve and the pintle will turn freely within the bearings formed by the collar of the sleeve and by the flanges of the plates respectively and be held substantially rigidly upright, but freely rotatable. If there are slight errors in boring the hole, it will be seen that the pintle and sleeve 30 maintain the perpendicularity of the pintle without materially disturbing the proper operation of the caster, and that the construction combines extreme simplicity of structure and economy of manufacture with great strength and reliability in use.

I claim the following:—

1. A caster combining, with a caster wheel, jaws and a rotary pintle, a sleeve forming a journal bearing for the upper part of the pintle, a carrying plate extending beneath the lower end of the sleeve and which surrounds the pintle and has a flange upturned and within the lower end of the sleeve, and a superimposed plate which surrounds the sleeeve and that has a flange upturned and outside the lower end of said sleeve.

2. A caster combining, with a caster wheel, jaws and a rotary pintle, a sleeve of sheet metal which has a continuous unbroken annular collar around the upper part of the pintle and has a plurality of sleeve members extending downward therefrom, a carrying plate extending beneath the lower end of the sleeve but loose therefrom and a plate interposed between the furniture leg and said carrying plate that has a flange upturned which surrounds the lower end of said sleeve, the said pintle having enlargements above the collar and below the carrying plate.

3. A caster combining, with a caster wheel, jaws and a rotary pintle, a carrying plate surrounding the pintle, a sleeve for the pintle and a plate superimposed over said carrying plate which surrounds the sleeve, the sleeve confined between an enlargement of the upper end of the pintle and the aforementioned plates while free to rotate and means for directly securing the carrying plate to the article to be carried.

4. A caster combining, with a caster wheel, jaws and a rotary pintle, a sleeve forming a journal bearing for the upper part of the pintle, a carrying plate extending beneath the lower end of the sleeve and which has a flange upturned and within the lower end of the sleeve and a plate interposed between said carrying plate and the center portions of the furniture leg and that has a flange upturned that surrounds the exterior sides of said sleeve, the carrying plate having an annular groove which receives the lower end of the sleeve and the interposed plate having an annular groove which receives the inner periphery of the furniture leg.

In testimony whereof I have signed this specification in the presence of two subscribing witnesses.

ALBERT B. DISS.

Witnesses:
E. P. LA GAY,
JOHN HERR.

Copies of this patent may be obtained for five cents each, by addressing the "Commissioner of Patents, Washington, D. C."